Nov. 7, 1933.      W. C. JACKSON      1,933,982
SPLASH GUARD
Filed Aug. 5, 1930
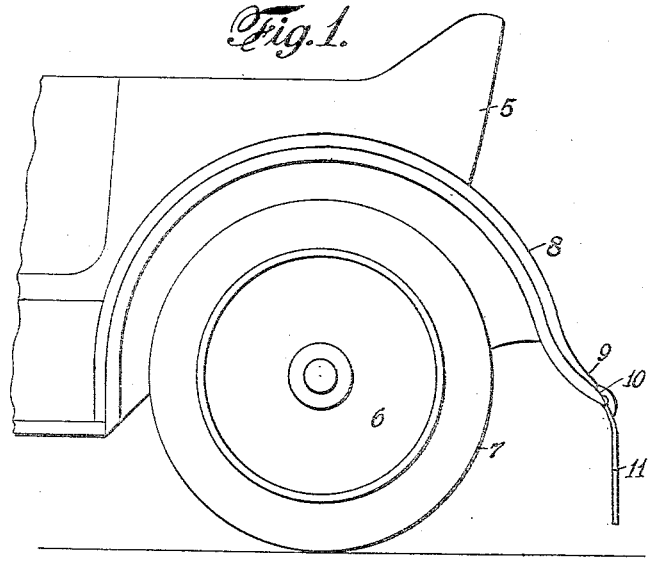
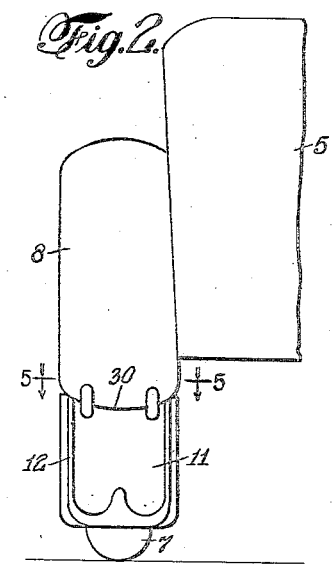
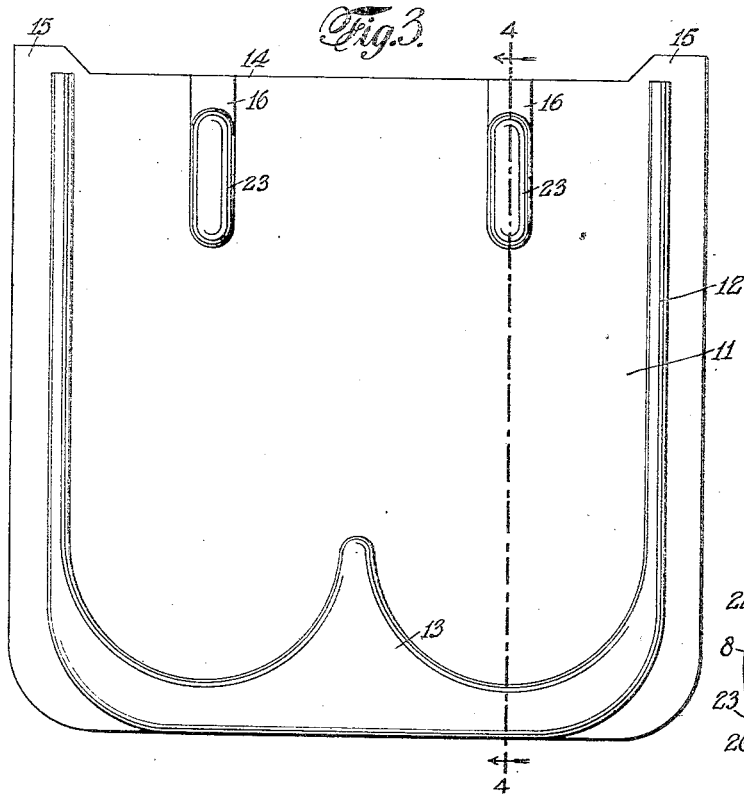
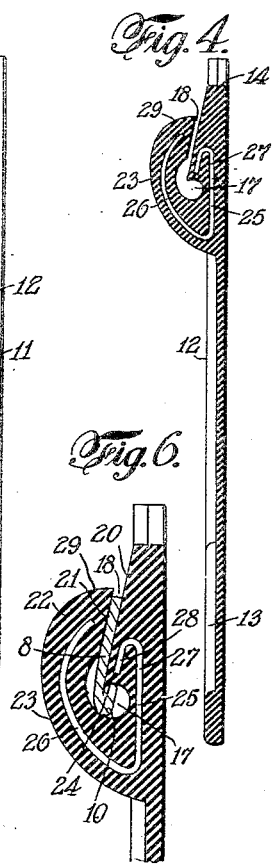
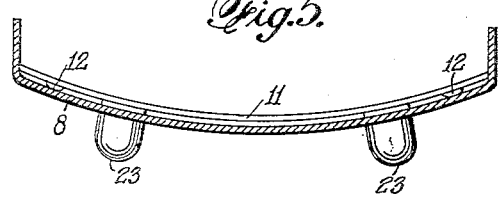
INVENTOR
WALTER C. JACKSON
BY
his ATTORNEY Patented Nov. 7, 1933

1,933,982

UNITED STATES PATENT OFFICE 1,933,982

SPLASH GUARD

Walter C. Jackson, Rahway, N. J., assignor to Tingley Reliance Rubber Corporation, Rahway, N. J., a corporation of New Jersey Application August 5, 1930. Serial No. 473,225

19 Claims. (Cl. 280—152)

This invention relates to splash guards for application particularly to the lower rear ends of wheel fenders of automobiles. It is designed to provide a strong device of this character having a flexible apron and yieldable, self-cushioned attaching devices formed integrally with the apron.

In the preferred embodiment of my invention the apron and attaching jaws are formed of rubber, these parts being molded integrally and vulcanized.

The principal object of my invention is to provide a splash guard which may be readily and securely attached to the fender of an automobile without marring the material of the fender or its finish.

Another object of my invention is to provide a clamp designed to act on a fish-hook principle for assuring a tight and permanent attachment of a splash guard flap to a fender.

Another object of the invention is to provide cushioned, spring jaws capable of securely attaching the device in position in such manner that blows administered to various parts of the apron and the jaws and the effort of pulling and tugging will not loosen their hold or mar the fender.

Another object of the invention is to provide holding means for a device of this character located entirely on the outer side of the apron so that when the device is in position on the fender its inner side, that is the side toward the wheel, is entirely free and the upper edge of the apron is held in close proximity to the inner face of the fender. The advantage of this construction is that the introduction of obstructions within the fender or upon its inner surface are avoided. It is only fair to assume that the designer of each particular automobile fender did not make it sufficiently oversize to readily admit of the introduction of clamps and bolts such as are frequently used in mounting splash guards. The presence of these obstructing fastening devices does not become apparent in the ordinary running of the motor vehicle, but when chains are used, particularly if the chain is loose or if one of the cross chains becomes detached so that it flies far out beyond the ordinary position of the wheel, it will be seen that if they catch on either the upper portion of the splash guard or its fastening device, the question then is which is the stronger of the two contacting bodies; either the chain will be broken or the splash guard torn off. If the splash guard is torn off it not only is liable to be injured and lost, but the fender is also very liable to be married if not permanently injured.

My present design of splash guard, by reason of the fact that it engages the lower rear edge of the fender rather than the sides of the fender toward the end as heretofore, enables me to make the apron itself considerably shorter in length although depending the same amount as heretofore below the fender.

Another object of my invention is to provide sturdy clamping jaws centrally located near the upper end of the apron of a splash guard whereby when they are applied in position on an automobile fender they serve to bend such apron upper end to conform to the shape of the fender and held such upper end in such a position that it is well out of the way of the wheel and devices which may be attached thereto.

In the accompanying drawing one practicable embodiment of my invention is illustrated, in which drawing:

Figure 1 shows one of my improved splash guards attached to the rear end of the fender of an automobile, the view also showing in side elevation the wheel, fender and some of the associated parts.

Fig. 2 shows a rear elevation of the splash guard, fender and some of the other parts shown in Fig. 1.

Fig. 3 shows on a larger scale the rear outer face of one of my improved splash guards.

Fig. 4 is a longitudinal section taken at about the plane of the line 4—4 in Fig. 3.

Fig. 5 is a cross-section at about the plane of the line 5—5 of Fig. 2 looking downwardly, Fig. 5 being on a larger scale than is Fig. 2, but on a smaller scale than the scale of Figs. 3 and 4, and Fig. 6 is a sectional detail of the preferred form of jaw in its attached position.

This invention is an improvement of a device which is quite generally mounted on the rear ends of fenders of automobiles for guarding various parts of the vehicle from the spatters thrown out by the wheels. Of course the primary purpose of the fender of an automobile is to guard the body from such spattering, yet as the fender is generally made of rigid sheet material, the ends of these rigid devices cannot be permitted to extend too close to the ground for various reasons. One is that it must be high enough to avoid the ordinary curbing at the sides of streets, and if the tires should become deflated, there must be clearance also. Therefore it has become the practice to mount flexible aprons at the rear of these fenders, and I heretofore designed and manufactured splash guards in the form of vulcanized rubber and adapted to be mounted on the fenders by clamping devices engaging the side flanges of the fenders. My present improvement however, relates to a device of this character in which the attaching means are in the form of a pair of sturdy jaws molded and integrally vulcanized with the flexible apron.

In Figure 1 there is illustrated a portion of an automobile body 5 supported by a wheel 6 having a conventional form of tire 7 which is housed by a fender 8, the conventional structure of which, at the present time, is sheet metal. The rear end 9 of the fender is shown curving outwardly and downwardly, which downwardly curving portion ends in a reinforcing bead 10 and to this portion of the fender there is shown mounted my improved splash guard.

The splash guard, in its present illustrated form, is assumed to be made of vulcanized rubber and comprises a flexible apron 11 formed at each side with a flexible but reinforcing bead 12 which, in the present illustration, is widened out into a weighing bar 13 of ornamental design. The upper edge 14 of the apron is substantially straight at the major portion, but is preferably formed at the sides with upstanding ears 15, the purpose of which will be explained later.

The attaching means in the present illustration comprises a pair of elastically yieldable jaws or clamps 16 of sturdy construction formed of rubber molded and vulcanized integrally with the apron 11 and extending outwardly from its rear face. By reference to the drawing, particularly to Figs. 5 and 6, it will be seen that one of the clamping jaws is in the form of a face 18 carried by a thickening of the upper portion of the apron and the other jaw face 21 is carried by a jaw portion 22 projecting outwardly and upwardly from the rear face of the apron.

The opening between the jaw faces 20 and 21 comprises an enlarged bead receiving portion 17, such opening extending upwardly in a narrow slot 18 through which the bead 10 is forced in applying the clamp to the fender. The jaw faces 20 and 21 are normally intended to engage the sheet of the fender above the bead.

Preferably the jaw face 20 slants outwardly toward its lower end and extends upwardly and downwardly beyond the face 21 which is carried by the free end of the jaw portion 22. The face 21 is opposed to the central portion of the face 20. Below the face 21 the jaw 22 is relieved and its surface 23 is curved and merges into the walls of the bead receiving opening 17. A downwardly directed lip 24 is formed between the merger of the wall of the opening 17 and the end of the face 20 which is designed to act on a fish-hook principle assuring a tight and permanent attachment to an automobile fender, particularly when this lip 24 is drawn into the angle produced by the bead 10 where this is bent against the fender 8.

For the purpose of reinforcing the jaw a metal body 25 is preferably molded within the jaw. This body 25 is preferably formed of spring steel and has an outwardly directed member 26 extending from a point well below the cavity 17 into free end 22. The body 27 lies preferably in about the plane of the rear surface of the apron 11 and has a downwardly and rearwardly hooked end 28 located in position to reinforce the downwardly directed lip 24.

In Fig. 6 it will be seen that the bead 10 is normally located within the cavity 17 and the fender part 9 is located in the slot 18, and that when in this position both the weight of the structure itself and any load incident to pulling or tugging on the apron is directly borne by this hooked end 28, and that pulling or downward pressure on the apron or on the fastening device will not release the grip of the jaw.

The shape of the extreme ends of automobile fenders varies. In some makes or models the lower line 30 is quite nearly flat. In others it is more circular. The ears 15 are for the purpose of guarding the spaces at each side which would normally be left open by the sides of the fender being narrow at regions just above the normal position of the top edge 14 of the apron.

Although in this application but one form of my invention is illustrated, which I regard at the present time as the preferred form, yet it will be apparent that changes may be made within the scope of the claims without departing from the spirit of the invention.

Having described my invention, I claim and desire to secure by Letters Patent:

1. An automobile fender splash guard, comprising a flexible, vulcanized rubber apron and a pair of vulcanized rubber clamps vulcanized upon one face of the apron centrally of its upper portion.

2. An automobile fender splash guard, comprising a vulcanized rubber apron and a pair of rubber attaching clamps vulcanized on one face of the apron centrally of its upper portion whereby when the attaching jaws are applied in position on an automobile fender they serve to bend such upper end to conform to the shape of the fender.

3. A splash guard comprising a flexible apron and a pair of cushioned attaching jaws secured to the apron, the jaws being so constructed and so located on the apron that when they are properly applied to the lower end of an automobile fender the jaws are presented on the outer face of the fender and the top end of the apron is held closely adjacent to the inner face of the fender.

4. An automobile fender splash guard, comprising an apron and a cushioned attaching clamp, the clamp having a portion constructed and adapted to embrace a bead at the lower edge of the fender and having a lip located in position to press into the corner formed between the bead and the inner face of the fender.

5. An automobile fender splash guard, comprising an apron and a cushioned attaching clamp, the jaw clamp having a portion constructed and adapted to embrace a bead at the lower edge of the fender and having a lip located in position to press into the corner formed between the bead and the inner face of the fender, and spring means embedded in the clamp for forming the same and reinforcing such lip.

6. A splash guard comprising an apron, a pair of vulcanized rubber clamps secured to the apron centrally of its upper portion, each of such clamps comprising a portion projecting outwardly from the surface of the apron and formed with a jaw face slanting outwardly toward its lower end, there being a jaw curving upwardly and outwardly and having a face opposite said slanting face and which latter slanting face extends upwardly and downwardly beyond the face of the said jaw face, there being an enlarged bead receiving cavity formed below the jaw faces, one of the walls of such recess having a downwardly directed lip constructed and adapted to enter the angle between the main sheet of an automobile fender and a bead formed thereon, and a reinforcing spring disposed within the jaws and having a portion located in position to reinforce the said downwardly directed lip.

7. An automobile fender splash guard, comprising an apron and an attaching clamp, the clamp having a portion constructed and adapted to embrace a bead at the lower edge of the fender and having a lip located in position to press into the corner formed between the bead and the inner face of the fender.

8. A splash guard for automobile fenders comprising in combination, a molded apron having gripping devices integral therewith at the upper marginal edge thereof having slots therein and enclosing springs having portions disposed at either side of said slots, whereby the slots yieldingly receive portions of a fender and frictionally embrace the same.

9. A splash guard for automobile fenders comprising in combination, an apron, a fender gripping device at the upper edge of said apron including a body of resilient material provided with a fender receiving slot and a spring having portions encased in said body at opposite sides of said slot and means for securing said device to said apron.

10. A fender gripping device for a splash guard comprising in combination, a body of yieldable material provided with a fender receiving slot having a spring member encased therein with parts at opposite sides of said slot.

11. A splash guard comprising an apron, a pair of vulcanized rubber clamps secured to the apron centrally of its upper portion, each of such clamps comprising a portion projecting outwardly from the surface of the apron and formed with a jaw face slanting outwardly toward its lower end, there being a jaw curving upwardly and outwardly and having a face opposite said slanting face and which latter slanting face extends upwardly and downwardly beyond the face of the said jaw face, there being an enlarged bead receiving cavity formed below the jaw faces, one of the walls of such recess having a downwardly directed lip constructed and adapted to enter the angle between the main sheet of an automobile fender and a bead formed thereon.

12. A splash guard for automobile fenders comprising in combination, a molded apron having gripping devices at the upper marginal edge thereof formed with slots for receiving a fender and spring devices associated therewith to cause said slots to yieldingly embrace a fender.

13. A splash guard for automobile fenders comprising in combination, an apron of molded material having lugs at the upper side thereof integral therewith, the said lugs being provided with slots extending inwardly from the upper sides thereof and enclosing U-shaped springs having portions at opposite sides of said slots tending to close said slots.

14. A splash guard for automobile fenders comprising in combination, an apron, a gripping device at the upper edge thereof including a spring encased in a body of yieldable material, the said body being formed with a fender receiving slot and portions of the spring disposed at opposite sides of the slot.

15. A splash flap for automobiles comprising a flap member having on one face near its top a plurality of finger extensions each of which forms with the body of the flap a throat to receive the edge of the fender, and a spring latch associated with each finger extension and adapted to engage the inside of the bead of the fender after it has been inserted into the throat, thereby to lock the flap to the fender.

16. A splash flap for automobiles comprising a flap member having integral therewith on its outer face adjacent its top a plurality of finger extensions, each of which forms with the body of the flap a throat to receive the beaded edge of the fender, a reinforcing member embedded in each finger and the adjacent body of the flap, and a resilient locking latch carried by each reinforcing member and embedded in the upper portion of the flap, each locking latch having its lower end positioned to engage the bead of the fender when the flap is applied thereto.

17. A splash flap for automobiles comprising a flap member having integral therewith on its outer face adjacent its top a plurality of finger extensions, each of which forms with the body of the flap a throat to receive the beaded edge of the fender, a reinforcing member embedded in each finger and the adjacent body of the flap, and a resilient locking latch integral with the reinforcing member and having its lower end in position to engage the bead of the fender when the splash flap is applied thereto.

18. A splash flap for automobiles comprising a flap member, a finger situated on the outer face of the flap and extending in a direction approximately parallel thereto and adapted to embrace the edge of the fender to which the flap is to be secured, and a spring also associated with the finger and adapted to engage the inside of the bead of the fender to lock the flap to the fender.

19. A splash flap for automobiles comprising a flap member having associated therewith near its top a plurality of hook-shaped members adapted to embrace the beaded edge of the fender of an automobile when the flap is applied to the fender with the top edge of the flap on the under side of the fender, and a spring also associated with each hook-shaped member and adapted to snap over the bead of the fender thereby to lock the flap in place.

WALTER C. JACKSON.